US012026736B1

(12) United States Patent
Maxwell et al.

(10) Patent No.: US 12,026,736 B1
(45) Date of Patent: Jul. 2, 2024

(54) PRODUCT RECLAMATION SYSTEM AND RELATED METHODS

(71) Applicant: INMAR SUPPLY CHAIN SOLUTIONS, LLC, Winston-Salem, NC (US)

(72) Inventors: Seth Maxwell, Lewisville, NC (US); Nirajan Kharal, Las Cruces, NM (US); Mark Lingelbach, Winston-Salem, NC (US)

(73) Assignee: INMAR SUPPLY CHAIN SOLUTIONS, LLC, Winston-Salem, NC (US)

(*) Notice: Subject to any disclaimer, the term of this patent is extended or adjusted under 35 U.S.C. 154(b) by 0 days.

(21) Appl. No.: 17/737,783

(22) Filed: May 5, 2022

(51) Int. Cl.
*G06Q 30/0208* (2023.01)
*G06Q 10/30* (2023.01)
*G06Q 30/018* (2023.01)
*G06Q 30/02* (2023.01)
*G06Q 30/0251* (2023.01)
*G06V 10/774* (2022.01)
*G06V 20/50* (2022.01)

(52) U.S. Cl.
CPC ......... *G06Q 30/0208* (2013.01); *G06Q 10/30* (2013.01); *G06Q 30/0185* (2013.01); *G06Q 30/0278* (2013.01); *G06V 10/774* (2022.01); *G06V 20/50* (2022.01); *G06Q 30/0267* (2013.01)

(58) Field of Classification Search
CPC ...... G06V 20/50; G06V 10/774; G06Q 10/30; G06Q 30/0185; G06Q 30/0278; G06Q 30/0267
See application file for complete search history.

(56) References Cited

U.S. PATENT DOCUMENTS

| 10,032,140 | B2 | 7/2018 | Bowles et al. |
| 11,816,690 | B1* | 11/2023 | Jerez .................. G06Q 30/0208 |
| 2006/0089897 | A1* | 4/2006 | Maas ..................... G06Q 40/04 705/37 |
| 2013/0275314 | A1* | 10/2013 | Bowles .............. G06Q 30/0278 705/308 |
| 2015/0206200 | A1* | 7/2015 | Edmondson ....... G06Q 30/0201 705/306 |

(Continued)

Primary Examiner — Ilana L Spar
Assistant Examiner — Alan J Woodworth, II
(74) Attorney, Agent, or Firm — ALLEN, DYER, DOPPELT, + GILCHRIST, P.A.

(57) ABSTRACT

A product reclamation system may include a mobile device associated with a given user. The mobile device may be configured to obtain an image of a product to be discarded. The system may also include a reclamation server configured to obtain the image of the product from the mobile device, and apply image recognition techniques to the obtained image to determine if the product is a reclaimable product. The server is configured to, when the product is determined to be a reclaimable product, operate a machine learning algorithm to determine a reclamation value for the reclaimable product, communicate the reclamation value to the mobile device, and prompt the given user, via the mobile device, to send the reclaimable product to a reclamation facility in exchange for the reclamation value, and generate and communicate a digital promotion to the mobile device based upon sending the product to the reclamation facility.

23 Claims, 5 Drawing Sheets

(56) References Cited

U.S. PATENT DOCUMENTS

| | | | |
|---|---|---|---|
| 2019/0102873 A1* | 4/2019 | Wang | G06V 10/40 |
| 2019/0236614 A1* | 8/2019 | Burgin | G06V 10/764 |
| 2020/0104870 A1* | 4/2020 | Tajiri | G06Q 30/0643 |
| 2021/0192340 A1* | 6/2021 | Stonehouse | G06N 3/04 |

* cited by examiner

PRODUCT RECLAMATION SYSTEM AND RELATED METHODS

TECHNICAL FIELD

The present invention relates to the field of product reclamation, and more particularly, to product reclamation incentivization, and related methods.

BACKGROUND

A typical product to be discarded, for example, as waste, may be transported to a landfill where it may decompose. Some products may include materials that may be undesirable for a landfill, for example, flammable, reactive, corrosive, or toxic materials. These products that include undesirable materials for a landfill may be considered household hazardous waste, for example, and include computers, electronics, paints, etc. When disposed at a landfill, these products may permit seeping of what may be considered hazardous materials into the ground, which may eventually enter a water system. Accordingly, it may be desirable to remove these products from a landfill or redirect these product away from a landfill.

A promotion may be for a particular product, brand of products, or service. A promotion may include text, images, or other content to convey information about the product, brand, or service, for example, to entice a given shopper to purchase the products or services. One type of promotion is a digital promotion, for example. A digital promotion is an electronic form of promotion, and may be embodied as an email, electronic notification, and/or short messaging service (SMS) message sent from a retailer or manufacturer or brand, for example.

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

SUMMARY

A product reclamation system may include a mobile wireless communications device associated with a given user. The mobile wireless communications device may be configured to obtain an image of a product to be discarded. The product reclamation system may also include a reclamation server configured to obtain the image of the product from the mobile wireless communications device, and apply image recognition techniques to the obtained image to determine if the product is a reclaimable product. The reclamation server is configured to, when the product is determined to be a reclaimable product, operate a machine learning algorithm to determine a reclamation value for the reclaimable product, communicate the reclamation value to the mobile wireless communications device, and prompt the given user, via the mobile wireless communication device, to send the reclaimable product to a reclamation facility in exchange for the reclamation value, and generate and communicate a digital promotion to the mobile wireless communications device based upon sending the reclaimable product to the reclamation facility.

The reclamation server may be configured to prompt the given user to accept the reclamation value, and based upon accepting the reclamation value, communicate at least one of mailing instructions and a mailing label to the given user to mail the reclaimable product to the reclamation facility, for example. The reclamation server may be configured to operate a machine learning algorithm to accept the image of the product as an input thereto, determine the reclaimable product based upon learned image characteristics associated with the reclaimable product, and update the machine learning algorithm based upon the image of the product and the corresponding reclaimable product.

The reclamation server may be configured to operate the machine learning algorithm to determine whether the product is counterfeit based upon learned characteristics of a corresponding counterfeit product. The reclamation server may be configured to update the machine learning algorithm based upon the image of the product and the counterfeit determination, for example.

The reclaimable product may have a brand associated therewith. The digital promotion may be redeemable toward another product of the brand, for example.

The reclamation server may be configured to communicate the digital promotion based upon receipt of the reclaimable product at the reclamation facility. The reclaimable product may have a product category associated therewith, and the digital promotion may be redeemable toward purchase of another product in the product category, for example.

The reclamation server may be configured to determine a disposal value of the reclaimable product, and determine the reclamation value to be greater than the disposal value, for example. The reclamation server may be configured to determine a donation value of the reclaimable product, and determine the reclamation value to be less than the donation value.

A method aspect is directed to a method of reclaiming a product to be discarded. The method may include using a reclamation server to obtain an image of the product to be discarded from a mobile wireless communications device associated with a given user, and apply image recognition techniques to the obtained image to determine if the product is a reclaimable product. The method may also include using the reclamation server to, when the product is determined to be a reclaimable product, operate a machine learning algorithm to determine a reclamation value for the reclaimable product, communicate the reclamation value to the mobile wireless communications device, and prompt the given user, via the mobile wireless communication device, to send the reclaimable product to a reclamation facility in exchange for the reclamation value. The method may also include using the reclamation server to, when the product is determined to be a reclaimable product, generate and communicate a digital promotion to the mobile wireless communications device based upon sending the reclaimable product to the reclamation facility.

A computer readable medium aspect is directed to a non-transitory computer readable medium for reclaiming a product to be discarded. The non-transitory computer readable medium includes computer executable instructions that when executed by a processor of a reclamation server cause the processor to perform operations. The operations may include obtaining an image of the product to be discarded from a mobile wireless communications device associated with a given user, and applying image recognition techniques to the obtained image to determine if the product is a reclaimable product. The operations may also include, when the product is determined to be a reclaimable product, operating a machine learning algorithm to determine a reclamation value for the reclaimable product, and communicating the reclamation value to the mobile wireless communications device, and prompting the given user, via the mobile wireless communication device, to send the reclaimable product to a reclamation facility in exchange for the reclamation value. The operations may further include, when the product is determined to be a reclaimable product, generating and communicating a digital promotion to the mobile wireless communications device based upon sending the reclaimable product to the reclamation facility.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
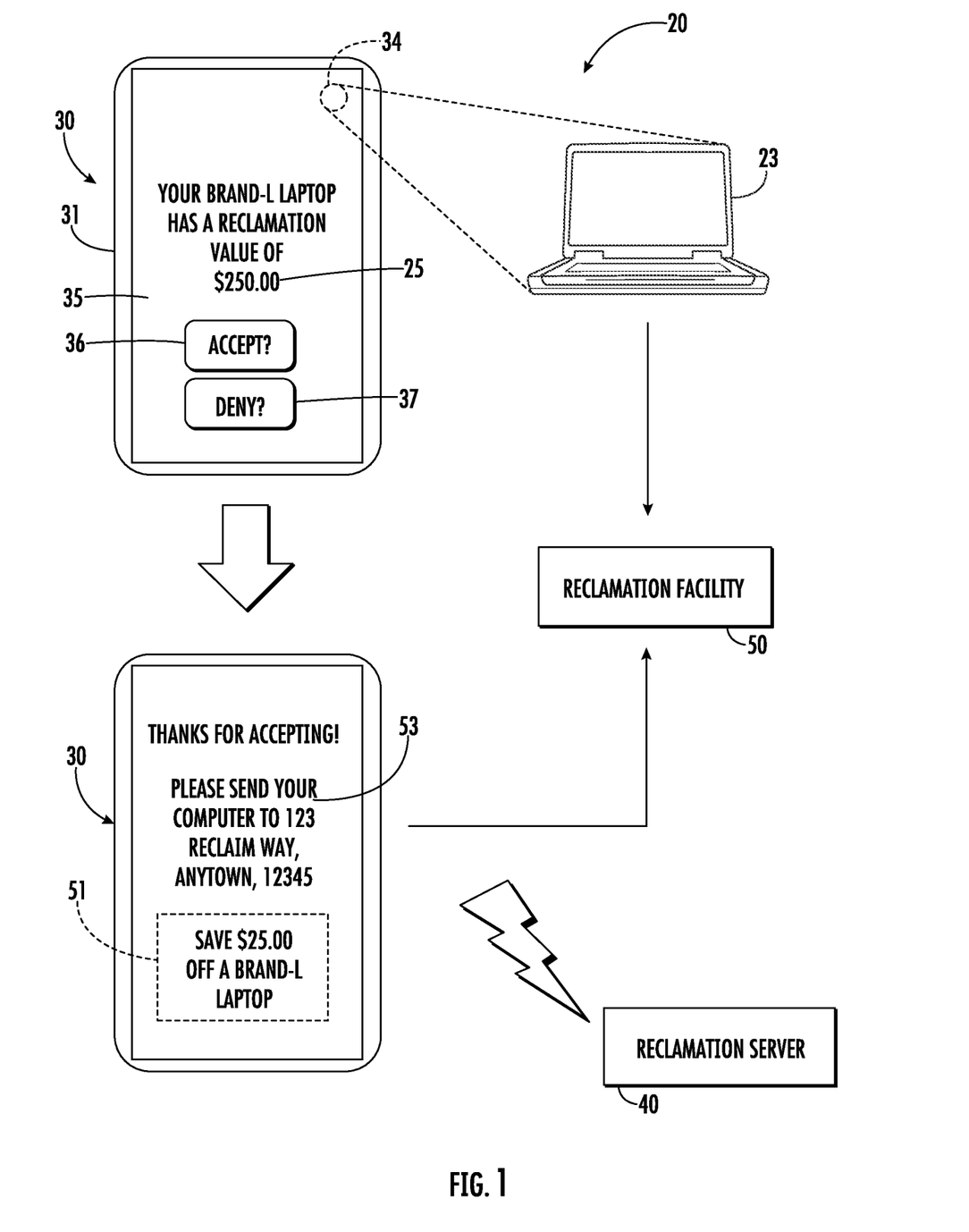
FIG. 1 is a schematic diagram of a product reclamation system in accordance with an embodiment.
Figure 2:
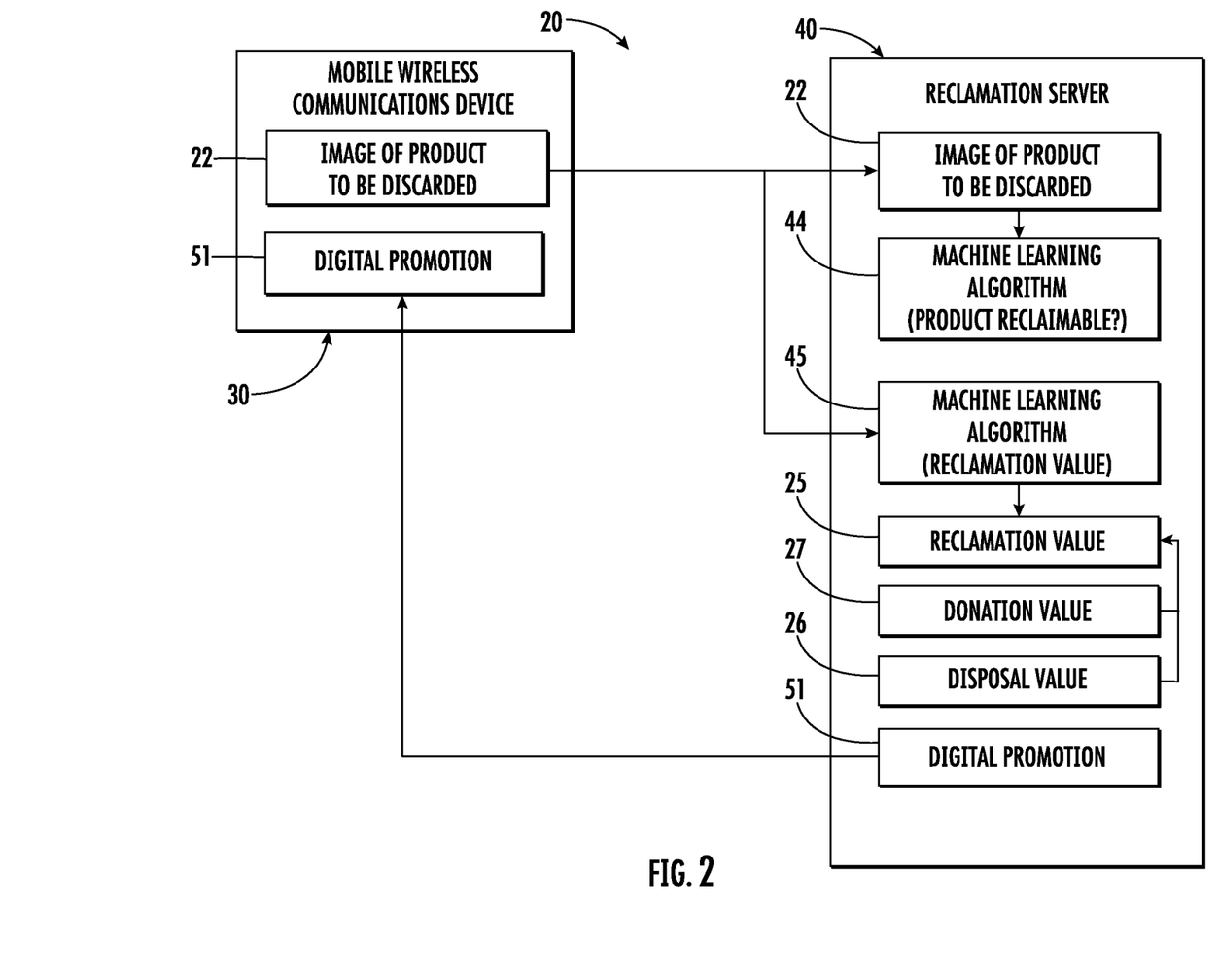
FIG. 2 is a schematic block diagram of the product reclamation system of FIG. 1.
Figure 3:
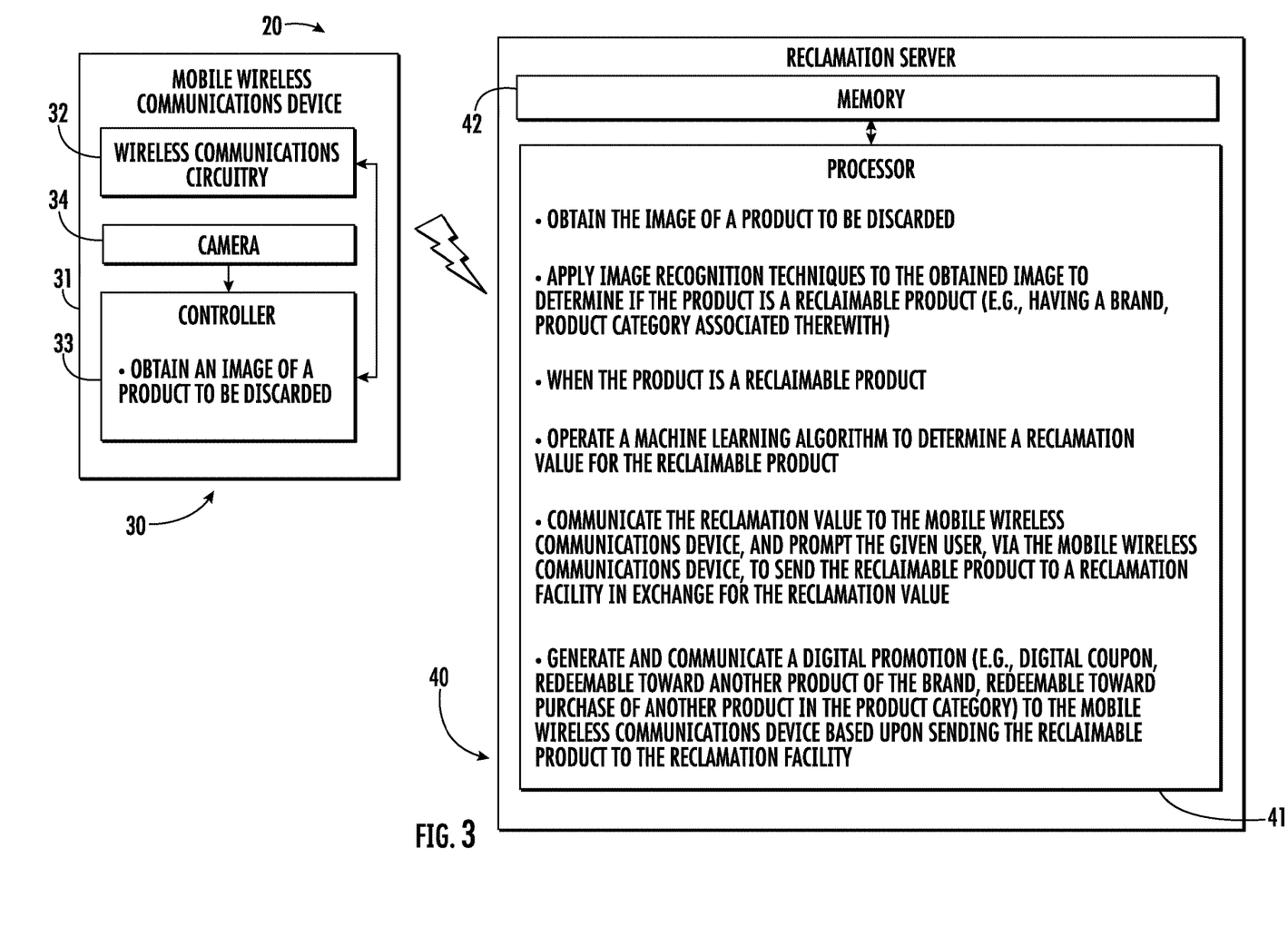
FIG. 3 is another schematic block diagram of the product reclamation system of FIG. 1.

Referring initially to FIGS. 1-3, a product reclamation system 20 includes a mobile wireless communications device 30 associated with a given user. The mobile wireless communications device 30 is illustratively in the form of a mobile phone or smartphone, and includes a housing 31, wireless communications circuitry 32 carried by the housing, and a controller 33 coupled to the wireless communications circuitry. The mobile wireless communications device 30 also includes a camera 34 carried by the housing 31 and coupled to the controller 33, and a display 35 also coupled to the controller. The camera 34 and the controller 33 cooperate to obtain an image 22 of a product to be discarded 23. While the mobile wireless communications device 30 is illustratively in the form of a smart phone or mobile phone, those skilled in the art will appreciate that the mobile wireless communications device may be another type of mobile wireless communications device, for example, a tablet computer, a laptop computer, or wearable device.

The product reclamation system 20 also includes a reclamation server 40. The reclamation server 40 includes a processor 41 and an associated memory 42 cooperating with the processor. While operations of the product reclamation system 20 are described herein, it will be appreciated that the processor 41 and the memory 42 cooperate to perform the operations.

Figure 4A:
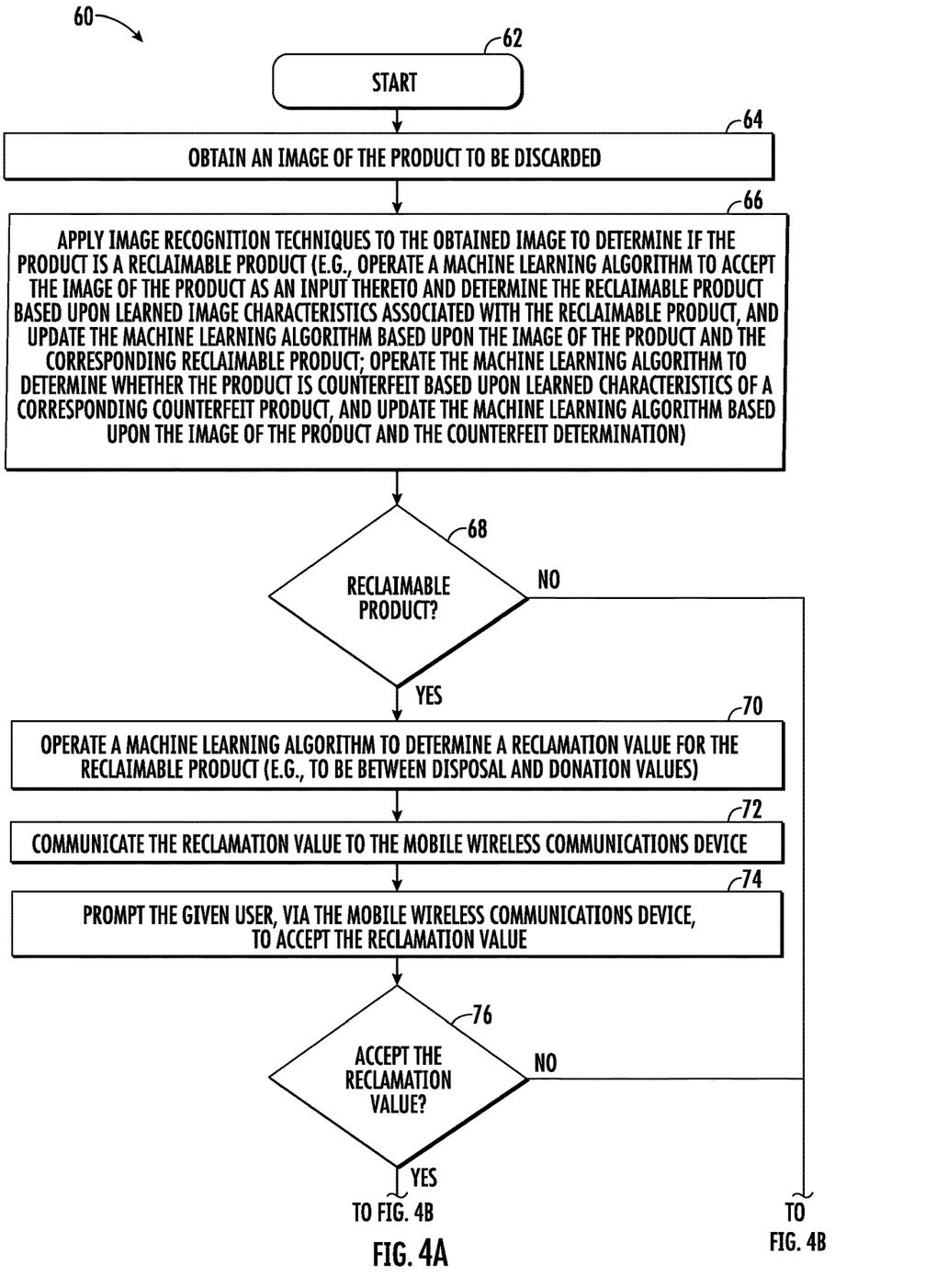
FIGS. 4A and 4B are flow diagrams illustrating operation of the reclamation server of FIG. 3.
Figure 4B:
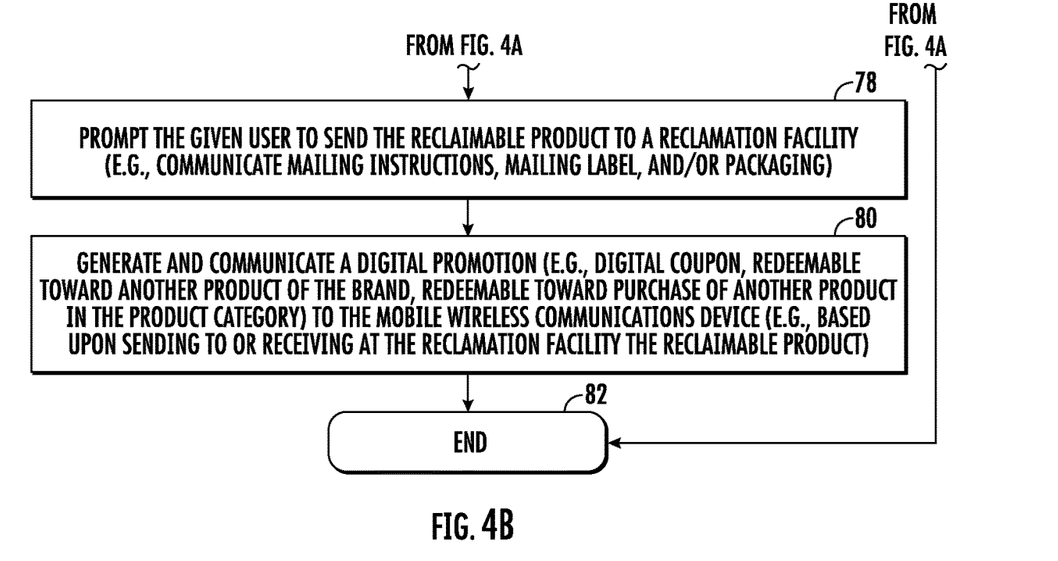

Referring now additionally to the flowchart 60 in FIGS. 4A-4B, beginning at Block 62, operations of the reclamation server 40 will now be described. At Block 64, the reclamation server 40 obtains the image 22 of the product to be discarded 23. More particularly, the reclamation server 40 cooperates with the mobile wireless communications device 30 via the wireless communications circuitry 32 so that the mobile wireless communications device communicates the image 22 to the reclamation server. Alternatively, the reclamation server 40 may retrieve the image 22 from the mobile wireless communications device 30.

The reclamation server 40, at Block 66, applies image recognition techniques to the obtained image to determine, at Block 68, if the product 23 is a reclaimable product. More particularly, the reclamation server may determine the product 23 is reclaimable based upon operation of a machine learning algorithm 44 accepts, as input, the image 22 of the product 23 and determines the reclaimable product based upon learning image characteristics associated with the reclaimable product. For example, such learned image characteristics for any given product to determine the reclaimable product may include determining a size and shape of the product based upon relative pixel locations within the image 22 and relative orientation of the product within the image (e.g. side, perspective, etc.). Other image characteristics may include color, machine readable indicia (e.g., barcodes), optical character recognition of text on the product 23 (e.g., brand name, model name, logo, model and/or serial numbers).

For example, an exemplary product may be a laptop computer, which may have a silver metallic color, with a logo on its cover, center, and have a tapered side profile, along with particular closed dimensions. By way of the image recognition techniques described herein, including operation of the machine learning algorithm 44, the reclamation server 40 determines the product is a laptop computer of a particular brand and model, and thus the product is a reclaimable product. The machine learning algorithm 44 may be updated based upon the determined reclaimable product. For example, the image (and its image characteristics) are used to train the machine learning algorithm 44 to the corresponding reclaimable product, for example, to obtain a more accurate determination of the reclaimable product.

In some embodiments, the machine learning algorithm 44 may additionally, for example, as part of determining the reclaimable product, determine if the product 23 is a counterfeit product, for example, based upon learned image characteristics associated with a corresponding counterfeit claimable product. More particularly, application of image recognition techniques to the image 22 and of learned image characteristics representative of a counterfeit product may be used to determine the product 23 is counterfeit. Similarly to the techniques described above, the image 22 is provided as an input to the machine learning algorithm 44 where learned image characteristics identify characteristics indicative of a counterfeit. This determination, similarly to the techniques described above with respect to the determination of a reclaimable product, may also be based upon information obtained using other image recognition techniques, such as, for example, OCR.

With respect to the exemplary product described above, while the product may be a reclaimable product (e.g., a laptop computer), the product may be determined to be counterfeit. Image characteristics that may, for example, contribute to a counterfeit determination may include an inexact logo (e.g., based upon a pixel placement determination relative to a real or true logo), off-color, inexact measurements (e.g., based upon a pixel placement determination), and/or other physically identifiable characteristics.

Accordingly, the reclamation server 40 may base the determination of whether the product 23 is a reclaimable product on the determination of whether the reclaimable product is a counterfeit. Of course, the reclamation server 40 may determine the product to be a reclaimable product and then, serially, determine that the reclaimable product is a counterfeit. Moreover, while a machine learning algorithm 44 is described as performing both the reclaimable product and counterfeit determinations, those skilled in the art will appreciate that the determinations may be performed independently by two machine learning algorithms.

As will be appreciated by those skilled in the art, the machine learning algorithm 44 may be based upon one or more of several basic algorithms or models, for example, artificial neural networks, decision trees, support-vector machines, and Bayesian networks, for example, as will be appreciated by those skilled in the art. To achieve the desired functionality, as described above, the basic machine learning algorithms may be augmented or improved to accept the described inputs and provide more accurate learning and reclaimed product determination.

If, at Block 68, the product 23 is determined to be a reclaimable product, the reclamation server 40 operates a machine learning algorithm 45 to determine a reclamation value 25 for the reclaimable product (Block 70). More particularly, the machine learning algorithm 45 accepts, as input, the image 22, and based upon image analysis techniques and learning of image characteristics that correspond to different conditions determines a corresponding reclamation value 25. More particularly, the reclamation server 40 may also accept as input pricing and/or images for the same or similar reclaimable product, for example, scraped from the internet or online marketplaces, to determine and learn the reclamation value 25. Prior purchase information, for example, historical reclamation prices and sales information, may also be used to determine the reclamation value 25.

The reclamation server 40 may also determine and learn a disposal value 26 of the reclaimable product, and a donation value 27 of the reclaimable product. The donation value 27 may be obtained or determined based upon taxation guidelines, for example (e.g., the value of the reclaimable product to a charitable organization). The disposal value 26 may be determined or obtained from values associated with buying junk or for materials. The disposal value 26 is typically far lower than any corresponding donation value 27. The reclamation server 40 may thus operate the machine learning algorithm 45 to determine the reclamation value 25 to be greater than the disposal value 26, but less than the donation value 27.

With respect to the exemplary product described above, the reclamation server 40 may determine that the reclaimable product has a reclamation value of $250.00 based upon the techniques describes above. The reclamation server 40 may determine physical damage based upon learned physical characteristics associated with the damage. For example, if the housing or case has a "ding" in it, the reclamation server 40, via the machine learning algorithm 45 may determine that the "ding" is cosmetic only and has a corresponding diminished value, for example, five percent, and thus the reclamation value may be $237.50. Other and/or additional elements may be used to determine the reclamation value and may be supplied as input to the machine learning algorithm 45, for example, determined supplies and demand.

As will be appreciated by those skilled in the art, the machine learning algorithm 45 may be based upon one or more of several basic algorithms or models, for example, artificial neural networks, decision trees, support-vector machines, and Bayesian networks, for example, as will be appreciated by those skilled in the art. To achieve the desired functionality, as described above, the basic machine learning algorithms may be augmented or improved to accept the described inputs and provide more accurate learning and reclaimed product determination.

The reclamation server 40 communicates the reclamation value 25 to the mobile wireless communications device 30 (Block 72). The reclamation server 40 cooperates with the mobile wireless communications device 30 to prompt the given user, via the mobile wireless communications device, to accept 36 (or deny 37) the reclamation value 25 (Block 74). For example, the reclamation value 25 may be displayed on the display 35 of the mobile wireless communications device 30 along with the prompt to provide input thereto (e.g., manually by touching a corresponding portion of the display 35 when the display is in the form of a touch display) to accept 36 or deny 37 the reclamation value 25.

Upon acceptance of the reclamation value 25 (Block 76), the reclamation server 40 prompts the given user to send the reclaimable product to a reclamation facility 50 in exchange for the reclamation value (FIG. 1) (Block 78). The reclamation server 40 may cooperate with the mobile wireless communications device 30 to communicate mailing instructions 53 for display on the display 35 and/or communicate a mailing label (e.g., prepaid) to the given user to mail the reclaimable product to reclamation facility 50. In some embodiments, the reclamation server 40 may generate or cause shipment of packaging materials sized for the reclaimable product (e.g. based upon determined dimensions from the application of the image recognition techniques) to the given user, for example, along with prepaid postage.

At Block 80, for example, based upon sending the reclaimable product to the reclamation facility 50 (Block 80), the reclamation server 40 generates and communicates a digital promotion 51, for example, a digital coupon or digital rebate, to the mobile wireless communications device 30. For example, the reclamation server 40 may cooperate with one or more servers that provide package tracking details to determine shipment progress of the reclaimable product (e.g., scanned by a shipper during pickup, or at or upon drop off at or with a shipper). The reclamation server 40 may generate and communicate the digital promotion 51 upon receipt of the reclaimable product with a shipper or upon receipt of the reclaimable product at the reclamation facility 50.

The reclaimable product may have a brand associated therewith. The digital promotion 51 may be redeemable toward purchase of a product of the same brand. Alternatively or additionally, the reclaimable product may have a product category associated therewith, and the digital promotion 51 may be redeemable toward purchase of another product in the same product category. The digital promotion 51 may be stored in a digital wallet associated with the given user, for example, and associated with a given retailer (e.g., the retailer's loyalty program). The digital promotion 51 has a redeemable value that is redeemable toward a purchase price of another product, for example, at a point-of-sale (POS) terminal or within an e-commerce platform (e.g. online). Operations end at Block 82.

A method aspect is directed to a method of reclaiming a product to be discarded 23. The method includes using a reclamation server 40 to obtain an image 22 of the product to be discarded 23 from a mobile wireless communications device 30 associated with a given user, and apply image recognition techniques to the obtained image to determine if the product is a reclaimable product. The method also includes using the reclamation server 40 to, when the product is determined to be a reclaimable product, operate a machine learning algorithm 45 to determine a reclamation value 25 for the reclaimable product, communicate the reclamation value to the mobile wireless communications device 30, and prompt the given user, via the mobile wireless communication device, to send the reclaimable product to a reclamation facility 50 in exchange for the reclamation value. The method also includes using the reclamation server 40 to, when the product 23 is determined to be a reclaimable product, generate and communicate a digital promotion 51 to the mobile wireless communications device 30 based upon sending the reclaimable product to the reclamation facility 50.

A computer readable medium aspect is directed to a non-transitory computer readable medium for reclaiming a product to be discarded 23. The non-transitory computer readable medium includes computer executable instructions that when executed by a processor 41 of a reclamation server 40 cause the processor to perform operations. The operations include obtaining an image 22 of the product to be discarded 23 from a mobile wireless communications device 30 associated with a given user, and applying image recognition techniques to the obtained image to determine if the product is a reclaimable product. The operations also include, when the product is determined to be a reclaimable product, operating a machine learning algorithm 45 to determine a reclamation value for the reclaimable product, and communicating the reclamation value to the mobile wireless communications device 30, and prompting the given user, via the mobile wireless communication device, to send the reclaimable product to a reclamation facility 50 in exchange for the reclamation value. The operations further include, when the product 23 is determined to be a reclaimable product, generating and communicating a digital promotion 51 to the mobile wireless communications device 30 based upon sending the reclaimable product to the reclamation facility 50.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A product reclamation system comprising:
a mobile wireless communications device associated with a given user and comprising a housing, a camera carried by the housing, and a controller configured to cooperate with the camera to obtain an image of a product to be discarded; and
a reclamation server configured to
obtain the image of the product from the mobile wireless communications device,
apply image recognition techniques to the obtained image to determine if the product is a reclaimable product by at least
operating a machine learning algorithm to determine the product by accepting, as input thereto, the obtained image of the product from the mobile wireless communications device and learning image characteristics of the reclaimable product comprising relative pixel locations within the image, relative orientation of the product within the image, and text on the product based upon performing an optical character recognition, and
operating the machine learning algorithm to determine whether the product is counterfeit by accepting, as input thereto, the obtained image of the product from the mobile wireless communications device so that the learned image characteristics of the reclaimable product identify characteristics indicative of a counterfeit product based upon a pixel placement determination of the relative pixel locations relative to a non-counterfeit product and text on the product relative to the counterfeit product based upon performing the optical character recognition, and when the product is determined to be a reclaimable product,
obtain from online marketplaces, images and pricing for at least one similar product to the reclaimable product,
operate a further machine learning algorithm to determine a reclamation value for the reclaimable product by at least accepting, as input, the obtained images and pricing for the at least one similar product, the obtained image of the product, and historical reclamation and sales prices for the product,
communicate the reclamation value to the mobile wireless communications device, and prompt the given user, via the mobile wireless communication device, to send the reclaimable product to a reclamation facility in exchange for the reclamation value, and
generate and communicate a digital coupon to the mobile wireless communications device based upon sending the reclaimable product to the reclamation facility, the digital coupon having a redeemable value associated therewith different than the reclamation value.

2. The product reclamation system of claim 1 wherein the reclamation server is configured to prompt the given user to accept the reclamation value, and based upon accepting the reclamation value, communicate at least one of mailing instructions and a mailing label to the given user to mail the reclaimable product to the reclamation facility.

3. The product reclamation system of claim 1 wherein the reclamation server is configured to update the machine learning algorithm based upon the image of the product and the corresponding reclaimable product.

4. The product reclamation system of claim 3 wherein the reclamation server is configured to update the machine learning algorithm based upon the image of the product and the counterfeit determination.

5. The product reclamation system of claim 1 wherein the reclaimable product has a brand associated therewith; and wherein the digital coupon is redeemable toward another product of the brand.

6. The product reclamation system of claim 1 wherein the reclamation server is configured to communicate the digital coupon based upon receipt of the reclaimable product at the reclamation facility.

7. The product reclamation system of claim 1 wherein the reclaimable product has a product category associated therewith, and wherein the digital coupon is redeemable toward purchase of another product in the product category.

8. The product reclamation system of claim 1 wherein the reclamation server is configured to determine a disposal value of the reclaimable product, and determine the reclamation value to be greater than the disposal value.

9. The product reclamation system of claim 1 wherein the reclamation server is configured to determine a donation value of the reclaimable product, and determine the reclamation value to be less than the donation value.

10. A reclamation server comprising:
a processor and an associated memory configured to
obtain an image of a product to be discarded from a mobile wireless communications device associated with a given user, the image being captured from a camera of the mobile wireless communications device,
apply image recognition techniques to the obtained image to determine if the product is a reclaimable product by at least
operating a machine learning algorithm to determine the product by accepting, as input thereto, the obtained image of the product from the mobile wireless communications device and learning image characteristics of the reclaimable product comprising relative pixel locations within the image, relative orientation of the product within the image, and text on the product based upon performing an optical character recognition, and
operating the machine learning algorithm to determine whether the product is counterfeit by accepting, as input thereto, the obtained image of the product from the mobile wireless communications device so that the learned image characteristics of the reclaimable product identify characteristics indicative of a counterfeit product based upon a pixel placement determination of the relative pixel locations relative to a non-counterfeit product and text on the product relative to the counterfeit product based upon performing the optical character recognition, and when the product is determined to be a reclaimable product,
obtain from online marketplaces, images and pricing for at least one similar product to the reclaimable product,
operate a further machine learning algorithm to determine a reclamation value for the reclaimable product by at least accepting, as input, the obtained images and pricing for the at least one similar product, the obtained image of the product, and historical reclamation and sales prices for the product,
communicate the reclamation value to the mobile wireless communications device, and prompt the given user, via the mobile wireless communication device, to send the reclaimable product to a reclamation facility in exchange for the reclamation value, and
generate and communicate a digital coupon to the mobile wireless communications device based upon sending the reclaimable product to the reclamation facility, the digital coupon having a redeemable value associated therewith different than the reclamation value.

11. The reclamation server of claim 10 wherein the processor is configured to prompt the given user to accept the reclamation value, and based upon accepting the reclamation value, communicate at least one of mailing instructions and a mailing label to the given user to mail the reclaimable product to the reclamation facility.

12. The reclamation server of claim 10 wherein the processor is configured to update the machine learning algorithm based upon the image of the product and the corresponding reclaimable product.

13. The reclamation server of claim 12 wherein the processor is configured to update the machine learning algorithm based upon the image of the product and the counterfeit determination.

14. The reclamation server of claim 10 wherein the reclaimable product has a brand associated therewith; and wherein the digital coupon is redeemable toward another product of the brand.

15. The reclamation server of claim 10 wherein the processor is configured to communicate the digital coupon based upon receipt of the reclaimable product at the reclamation facility.

16. A method of reclaiming a product to be discarded comprising:
using a reclamation server to
obtain an image of the product to be discarded from a mobile wireless communications device associated with a given user, the image being captured from a camera of the mobile wireless communications device,
apply image recognition techniques to the obtained image to determine if the product is a reclaimable product by at least
operating a machine learning algorithm to determine the product by accepting, as input thereto, the obtained image of the product from the mobile wireless communications device and learning image characteristics of the reclaimable product comprising relative pixel locations within the image, relative orientation of the product within the image, and text on the product based upon performing an optical character recognition, and
operating the machine learning algorithm to determine whether the product is counterfeit by accepting, as input thereto, the obtained image of the product from the mobile wireless communications device so that the learned image characteristics of the reclaimable product identify characteristics indicative of a counterfeit product based upon a pixel placement determination of the relative pixel locations relative to a non-counterfeit product and text on the product relative to the counterfeit product based upon performing the optical character recognition, and when the product is determined to be a reclaimable product,
operate a further machine learning algorithm to determine a reclamation value for the reclaimable product by at least accepting, as input, the obtained images and pricing for the at least one similar product, the obtained image of the product, and historical reclamation and sales prices for the product,
communicate the reclamation value to the mobile wireless communications device, and prompt the given user, via the mobile wireless communication device, to send the reclaimable product to a reclamation facility in exchange for the reclamation value, and generate and communicate a digital coupon to the mobile wireless communications device based upon sending the reclaimable product to the reclamation facility, the digital coupon having a redeemable value associated therewith different than the reclamation value.

17. The method of claim 16 wherein using the reclamation server comprises using the reclamation server to prompt the given user to accept the reclamation value, and based upon accepting the reclamation value, communicate at least one of mailing instructions and a mailing label to the given user to mail the reclaimable product to the reclamation facility.

18. The method of claim 16 wherein using the reclamation server comprises using the reclamation server to update the machine learning algorithm based upon the image of the product and the corresponding reclaimable product.

19. The method of claim 18 wherein using the reclamation server comprises using the reclamation server to update the machine learning algorithm based upon the image of the product and the counterfeit determination.

20. A non-transitory computer readable medium for reclaiming a product to be discarded, the non-transitory computer readable medium comprising computer executable instructions that when executed by a processor of a reclamation server cause the processor to perform operations comprising:

obtaining an image of the product to be discarded from a mobile wireless communications device associated with a given user, the image being captured from a camera of the mobile wireless communications device; and applying image recognition techniques to the obtained image to determine if the product is a reclaimable product by at least operating a machine learning algorithm to determine the product by accepting, as input thereto, the obtained image of the product from the mobile wireless communications device and learning image characteristics of the reclaimable product comprising relative pixel locations within the image, relative orientation of the product within the image, and text on the product based upon performing an optical character recognition, and operating the machine learning algorithm to determine whether the product is counterfeit by accepting, as input thereto, the obtained image of the product from the mobile wireless communications device so that the learned image characteristics of the reclaimable product identify characteristics indicative of a counterfeit product based upon a pixel placement determination of the relative pixel locations relative to a non-counterfeit product and text on the product relative to the counterfeit product based upon performing the optical character recognition, and when the product is determined to be a reclaimable product, obtaining from online marketplaces, images and pricing for at least one similar product to the reclaimable product, operating a further machine learning algorithm to determine a reclamation value for the reclaimable product by at least accepting, as input, the obtained images and pricing for the at least one similar product, the obtained image of the product, and historical reclamation and sales prices for the product, communicating the reclamation value to the mobile wireless communications device, and prompting the given user, via the mobile wireless communication device, to send the reclaimable product to a reclamation facility in exchange for the reclamation value, and generating and communicating a digital coupon to the mobile wireless communications device based upon sending the reclaimable product to the reclamation facility, the digital coupon having a redeemable value associated therewith different than the reclamation value.

21. The non-transitory computer readable medium of claim 20 wherein the operations comprise prompting the given user to accept the reclamation value, and based upon accepting the reclamation value, communicating at least one of mailing instructions and a mailing label to the given user to mail the reclaimable product to the reclamation facility.

22. The non-transitory computer readable medium of claim 20 wherein the operations comprise updating the machine learning algorithm based upon the image of the product and the corresponding reclaimable product.

23. The non-transitory computer readable medium of claim 22 wherein the operations comprise updating the machine learning algorithm based upon the image of the product and the counterfeit determination.

\* \* \* \* \*